US009783689B2

(12) United States Patent
Yamada et al.

(10) Patent No.: US 9,783,689 B2
(45) Date of Patent: Oct. 10, 2017

(54) SOLVENT-BASED INKJET INK

(71) Applicants: TOYO INK SC HOLDINGS CO., LTD., Tokyo (JP); TOYO INK CO., LTD., Tokyo (JP)

(72) Inventors: Kohei Yamada, Tokyo (JP); Norio Suzuki, Tokyo (JP); Daisuke Fujiwara, Tokyo (JP); Shinsuke Tsurutani, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 15/026,608

(22) PCT Filed: Oct. 2, 2014

(86) PCT No.: PCT/JP2014/076434
§ 371 (c)(1),
(2) Date: Apr. 1, 2016

(87) PCT Pub. No.: WO2015/050219
PCT Pub. Date: Apr. 9, 2015

(65) Prior Publication Data
US 2016/0222229 A1  Aug. 4, 2016

(30) Foreign Application Priority Data
Oct. 2, 2013 (JP) .................. 2013-207643

(51) Int. Cl.
C09D 11/36 (2014.01)
C09D 11/106 (2014.01)
C09D 11/03 (2014.01)
C09D 11/326 (2014.01)
C09D 11/322 (2014.01)
C09D 11/40 (2014.01)
C09D 11/102 (2014.01)
C09D 11/107 (2014.01)

(52) U.S. Cl.
CPC ............ *C09D 11/03* (2013.01); *C09D 11/102* (2013.01); *C09D 11/106* (2013.01); *C09D 11/107* (2013.01); *C09D 11/322* (2013.01); *C09D 11/326* (2013.01); *C09D 11/36* (2013.01); *C09D 11/40* (2013.01)

(58) Field of Classification Search
CPC ....... C09D 11/03; C09D 11/322; C09D 11/36; C09D 11/326; C09D 11/106; C09D 11/107
See application file for complete search history.

(56) References Cited
U.S. PATENT DOCUMENTS

2004/0266907 A1  12/2004 Sugita et al.
2005/0075418 A1  4/2005 Nishiguchi

2007/0119335 A1* 5/2007 Nakano ............... C09D 11/033
106/31.6
2008/0097005 A1  4/2008 Shiotani
2010/0280158 A1  11/2010 Shiotani et al.
2010/0317775 A1  12/2010 Aida et al.
2011/0021675 A1* 1/2011 Shigemori ........... C08G 18/285
524/88
2011/0230603 A1  9/2011 Yoda et al.
2013/0310496 A1  11/2013 Shiotani et al.

FOREIGN PATENT DOCUMENTS

| EP | 1783179 | 5/2007 |
|---|---|---|
| EP | 2911004 | 8/2015 |
| JP | 2002-294121 | 10/2002 |
| JP | 2005-015671 | 1/2005 |
| JP | 2005-133089 | 5/2005 |
| JP | 2006-056990 | 3/2006 |
| JP | 2007-284642 | 11/2007 |
| JP | 2008-101153 | 5/2008 |
| JP | 2009-126915 | 6/2009 |
| JP | 2010018643 | 1/2010 |
| JP | 2010-024352 | 2/2010 |
| JP | 2010-126585 | 6/2010 |
| JP | 2011063768 | 3/2011 |
| JP | 2011-141521 | 7/2011 |
| JP | 2011-225714 | 11/2011 |
| JP | 2011-225834 | 11/2011 |
| JP | 2012-136631 | 7/2012 |

(Continued)

OTHER PUBLICATIONS

"English Translation of International Preliminary Report on Patentability(PCT/IB/373)" of PCT/JP2014/076434, mailed on Apr. 5, 2016, p. 1-p. 10.
"Search Report of Europe Counterpart Application", issued on Jun. 13, 2016, p. 1-p. 10, in which the listed references were cited.
"International Search Report (Form PCT/ISA/210)", mailed on Jan. 13, 2015, with English translation thereof, pp. 1-4.
"Office Action of Japan Counterpart Application" with English translation thereof, issued on Apr. 25, 2017, p1-p5.
"Office Action of Europe Counterpart Application", issued on Jun. 13, 2017, p1-p5.

(Continued)

*Primary Examiner* — Robert Harlan
(74) *Attorney, Agent, or Firm* — Jianq Chyun IP Office

(57) ABSTRACT

The present invention relates to a solvent-based inkjet ink containing at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50. The present invention enables a dispersion of low viscosity and good stability to be generated in an extremely short dispersion time, and is able to provide an inkjet ink which forms an ink coating film that suffers no whitening and has superior resistance (abrasion resistance and alcohol resistance).

12 Claims, No Drawings

(56) References Cited

FOREIGN PATENT DOCUMENTS

| JP | 2013-189566 | 9/2013 |
| JP | 2013-209523 | 10/2013 |
| JP | 2014-218537 | 11/2014 |
| WO | 2009/063654 | 5/2009 |

OTHER PUBLICATIONS

"Notification of Reasons for Refusal of Japanese Counterpart Application No. 2013-207643," issued on Jul. 11, 2017, with English translation thereof, pp. 1-6, in which the listed references were cited.

* cited by examiner

SOLVENT-BASED INKJET INK

CROSS-REFERENCE TO RELATED APPLICATION

This application is a 371 application of International PCT application serial no. PCT/JP2014/076434, filed on Oct. 2, 2014, which claims the priority benefit of Japan application no. 2013-207643, filed on Oct. 2, 2013. The entirety of each of the above-mentioned patent applications is hereby incorporated by reference herein and made a part of this specification.

TECHNICAL FIELD

The present invention relates to a solvent-based inkjet ink.

BACKGROUND ART

Examples of the types of inks that can be used in inkjet printers include wax inks that are solid at normal temperatures, solvent-based inks containing an organic solvent as the main component, water-based inks containing water as the main component, and photocurable inks that are cured by light irradiation. Solvent-based inks are widely used in industrial applications such as outdoor advertising.

Inks for outdoor advertising applications not only require superior weather resistance for the ink coating film, but also require high gloss, a wide color gamut and superior alcohol resistance for the ink coating film, and superior stability and the like for the ink. The gloss and color gamut are strongly affected by the pigment dispersion level, and therefore in order to achieve the desired qualities, the dispersion time has needed to be lengthened, resulting in a problem of reduced productivity.

Furthermore, in order to improve the alcohol resistance of the ink coating film, the proportion of resin contained within the ink must be increased as much as possible. On the other hand, if the viscosity of the pigment dispersion is too high, then there is a possibility that the proportion of resin required to satisfactorily improve the alcohol resistance may not be achievable, meaning it is necessary to reduce the viscosity of the pigment dispersion.

In inkjet color printing, a three-color ink set composed of pigment inks of yellow (Y), magenta (M) and cyan (C), or a four-color ink set which also includes black (K), is often used to generate different hues.

In this case, the coloration vividness of mixed color portions containing two or more colors plays an important role in expanding the color reproducibility range.

Mixed color portions of two or more colors tend to suffer from reduced saturation. As a result, one method which could be considered would be to increase the pigment concentration in the ink, but this method tends to cause an increase in the ink viscosity. If the ink viscosity is too high, then the inkjet dischargeability tends to deteriorate, and as mentioned above, improving the resistance of the ink coating film by increasing the proportion of resin becomes impossible.

Accordingly, reducing the viscosity of the pigment dispersion is also necessary from the viewpoint of improving two-color coloration vividness.

In order to reduce the viscosity of the pigment dispersion, a pigment dispersant obtained by reacting a polyallylamine with a vinyl copolymer having a functional group that exhibits reactivity with an amino group has been proposed (Patent Document 1). Further, the use of a prescribed solvent system containing a glycol ether or the like has also been proposed (Patent Document 2).

PRIOR ART DOCUMENTS

Patent Documents

Patent Document 1: JP 2007-284642 A
Patent Document 2: JP 2006-056990 A

SUMMARY OF THE INVENTION

Problems to be Solved by the Invention

However, a solvent-based inkjet ink having a good balance of the ink properties mentioned above is still yet to be achieved. The present invention has been developed in light of this situation, and has an object of providing an inkjet ink which enables a dispersion of low viscosity and good stability to be generated in an extremely short dispersion time, and yields an ink which suffers no whitening, has superior resistance (abrasion resistance and alcohol resistance), and exhibits excellent coloration vividness and color reproducibility.

Means to Solve the Problems

The above object is achieved by the present invention described below.

In other words, the present invention relates to a solvent-based inkjet ink comprising at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50.

Further, the present invention also relates to the above solvent-based inkjet ink wherein the dispersant has a weight average molecular weight (Mw) of 5,000 to 20,000, an acid value (mgKOH/g) of 5 to 20, and an amine value (mgKOH/g) of 20 to 50.

Furthermore, the present invention also relates to the above solvent-based inkjet ink wherein a ratio (Mw/Mn) of the weight average molecular weight (Mw) relative to the number-average molecular weight (Mn) of the dispersant is not more than 2.

Further, the present invention also relates to the above solvent-based inkjet ink wherein the dispersant has a main chain composed of a polyethyleneimine and a side chain having at least an oxyalkylenecarbonyl group.

Furthermore, the present invention also relates to the above solvent-based inkjet ink wherein the organic solvent comprises at least one solvent selected from the group consisting of glycol monoester-based solvents, glycol diether-based solvents and lactate ester-based solvents.

Further, the present invention also relates to the above solvent-based inkjet ink wherein the binder resin comprises at least one resin selected from the group consisting of vinyl chloride-vinyl acetate-based resins and acrylic-based resins.

Further, the present invention also relates to the above solvent-based inkjet ink wherein the pigment comprises at least one disazo yellow pigment selected from the group consisting of C.I. Pigment Yellow 12, 13, 14, 17, 55, 83, 174, 176 and 188.

Furthermore, the present invention also relates to the above solvent-based inkjet ink wherein the disazo yellow pigment comprises C.I. Pigment Yellow 83.

Further, the present invention also relates to the above solvent-based inkjet ink wherein the pigment comprises at least one pigment selected from the group consisting of quinacridone pigments and naphthol AS-based pigments.

Furthermore, the present invention also relates to the above solvent-based inkjet ink wherein the pigment comprises at least one pigment selected from the group consisting of C.I. Pigment Violet 19, and C.I. Pigment Red 122 and 146.

Further, the present invention also relates to the above solvent-based inkjet ink wherein the pigment comprises a phthalocyanine pigment.

Moreover, the present invention also relates to an ink set which includes the above solvent-based inkjet ink.

Effects of the Invention

The present invention is able to provide an inkjet ink which has excellent stability, is resistant to whitening of the ink coating film when recorded onto a non-absorbent substrate such as a polyvinyl chloride, and exhibits superior resistance and coloration vividness.

EMBODIMENTS FOR CARRYING OUT THE INVENTION

The embodiments for carrying out the present invention are described below. In the following description, unless specifically stated otherwise, "parts" and "%" indicate "parts by weight" and "% by weight" respectively.

The composition of the solvent-based inkjet ink of the present invention (in the present invention, also referred to as simply "the ink") includes a pigment, a pigment dispersant, an organic solvent, a binder resin, and other additives and the like, and contains essentially no water. The expression "contains essentially no water" means that no water is added intentionally to the ink, and does not exclude traces of water contained within the ink components. For example, the water content relative to the total weight of the ink is typically not more than 0.5%, and is more preferably 0.3% or less.

Each of the components is described below.

[Dispersant]

The dispersant used in the present invention has a weight average molecular weight (Mw) of at least 5,000 but less than 50,000, an acid value (mgKOH/g) of 5 to 20, and an amine value (mgKOH/g) of 5 to 50.

Here, Mw can be determined as the styrene equivalent molecular weight by typical gel permeation chromatography (hereafter abbreviated as GPC).

For example, Mw can be represented by the polystyrene equivalent molecular weight measured using a TSKgel column (manufactured by Tosoh Corporation) and a GPC apparatus (HLC-8320GPC manufactured by Tosoh Corporation) fitted with an RI detector, and using DMF as the developing solvent.

The "acid value" represents the acid value per 1 g of dispersant solid fraction, and can be determined by a potentiometric titration method in accordance with JIS K 0070.

The "amine value" represents the amine value per 1 g of dispersant solid fraction, and refers to the value obtained by a potentiometric titration method using a 0.1 N aqueous solution of hydrochloric acid, and subsequent calculation of the equivalent amount of potassium hydroxide.

The weight average molecular weight (hereafter abbreviated as Mw) of the dispersant used in the present invention is preferably from 5,000 to 20,000, and more preferably from 10,000 to 20,000. Provided Mw is at least 5,000, the stability of the pigment dispersant itself within the organic solvent used in the ink is good, and therefore the stability of the pigment dispersion can be improved. Provided Mw is not more than 20,000, the compatibility with the binder resin is favorable, the whitening phenomenon of the ink coating film can be suppressed, and the coloration vividness improves. Moreover, the pigment dispersion time required to achieve a viscosity within the low viscosity range that is ideal for inkjet inks can be shortened. Achieving a low viscosity offers the advantage that the proportion of the binder resin within the ink, which contributes to the resistance of the ink coating film, can be increased, thereby improving the alcohol resistance of the ink coating film.

Moreover, the dispersant preferably has a ratio (Mw/Mn) of the weight average molecular weight (Mw) relative to the number-average molecular weight (Mn), determined by GPC, that is not more than 2. The value of Mw/Mn is preferably from 1 to 2, and more preferably from 1 to 1.8.

As is generally well known, Mw/Mn represents the molecular weight dispersivity of the resin, and a value closer to 1 indicates a narrower molecular weight distribution.

The inventors found that by ensuring that Mw/Mn is not more than 2, variation could be suppressed during production of the pigment dispersion obtained by dispersing the pigment in the dispersant and the organic solvent and the like, a combination of reduced viscosity and good storage stability could be achieved for the pigment dispersion, and the coloration vividness and secondary color saturation could be improved.

There are no particular limitations on the structure of the dispersant, provided that the pigment adsorption sites (main chain) and the dispersion stabilization sites (side chains) are arranged with good balance, but a dispersant have a so-called comb-shaped backbone can be used particularly favorably.

The dispersant preferably has a main chain backbone composed of a resin such as a polyurethane, polyacrylic acid, polyacrylate ester, polyacrylonitrile, polyester, polyamide, polyimide, polyurea, polyallylamine or polyethyleneimine, and side chain structures composed of a resin such as a polyurethane, polyacrylic acid, polyacrylate ester, polyacrylonitrile, or a polyester such as polycaprolactone or polyvalerolactone.

In terms of reducing the viscosity of the pigment dispersion and ensuring good ink storage stability, the main chain is preferably a polyallylamine or polyethyleneimine, and dispersants in which oxyalkylenecarbonyl groups have been introduced by modifying the main chain with side chains composed of a polyester such as polycaprolactone or polyvalerolactone are particularly preferable. Among such structures, dispersants in which the main chain is composed of a polyethyleneimine, and the side chains have at least an oxyalkylenecarbonyl group are particularly desirable.

The aforementioned dispersants in which the main chain is composed of a polyethyleneimine or the like and the side chains have at least an oxyalkylenecarbonyl group can be synthesized using conventional methods.

For example, the dispersants can be obtained by preparing a compound disclosed in JP 2002-509787 A by reacting an organic acid such as glycolic acid with a lactone such as a polycaprolactone, and then reacting the resulting compound with a polyamine or a polyimine such as a polyethyleneimine under a nitrogen atmosphere at 100 to 180° C.

The weight average molecular weight, the acid value and the amine value of the dispersant can be adjusted, for example, by appropriately selecting the weight average molecular weights, the acid values and the amine values of the polyethyleneimine and the polycaprolactone that represent the starting materials, and then altering the reaction temperature and the stirring time for the reaction between the polyethyleneimine and the polycaprolactone.

However, there are no particular limitations on the method employed, provided a dispersant having the prescribed weight average molecular weight, acid value and amine value can be obtained.

The acid value (mgKOH/g) of the dispersant is from 5 to 20, and preferably from 5 to 15. The amine value (mgKOH/g) is from 5 to 50, preferably from 20 to 50, and more preferably from 25 to 40.

When the acid value and the amine value of the dispersant satisfy the above ranges, the time required during the pigment dispersion process to achieve a viscosity for the pigment dispersion that is low enough to be suitable for an inkjet ink can be shortened.

Moreover, the storage stability of the ink improves, the saturation of ink mixed color portions formed during printing is excellent, and the color reproducibility is also excellent. If the storage stability is not favorable, then the fluidity of the ink within the flow paths inside the printer tends to deteriorate, and there is a concern that this may lead to discharge faults from the inkjet head.

If the acid value and the amine value do not satisfy the above ranges, then the viscosity of the pigment dispersion increases, adding sufficient binder resin becomes impossible, and obtaining the desired resistance properties for the ink coating film becomes difficult.

Commercially available products can also be used as the dispersant, and examples of such products include SOLSPERSE 32000 and SOLSPERSE J200 manufactured by The Lubrizol Corporation, and AJISPER PB821 and PB822 manufactured by Ajinomoto Fine-Techno Co., Inc.

The dispersants may be used alone or combined, depending on the types of pigment and organic solvent used.

In terms of reducing the viscosity of the pigment dispersion and achieving favorable ink stability, the dispersant is preferably included in an amount of 0.1 to 10% by weight, and more preferably 0.1 to 5% by weight, relative to the weight of the ink, and in an amount of 10 to 100% by weight, and more preferably 30 to 60% by weight, relative to the weight of the pigment.

[Organic Solvent]

There are no limitations on the organic solvent used in the present invention. However, from the viewpoints of the ink stability, which derives from the balance between the solubility of the dispersant and the solubility of the binder resin in the organic solvent, and the drying properties and the like of the ink coating film, which derive from the drying rate of the organic solvent, the use of at least one organic solvent selected from among glycol monoester-based solvents, glycol diether-based solvents and lactate ester-based solvents is preferable.

Examples of the glycol monoester-based solvents include (poly)ethylene glycol monoether monoester-based solvents such as ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate and diethylene glycol monobutyl ether butyrate, and (poly)propylene glycol monoether monoester-based solvents such as propylene glycol monomethyl ether acetate, dipropylene glycol monomethyl ether acetate, propylene glycol monomethyl ether propionate, dipropylene glycol monomethyl ether propionate, propylene glycol monomethyl ether butyrate and dipropylene glycol monomethyl ether butyrate.

Examples of the glycol diether-based solvents include diethylene glycol diethyl ether, diethylene glycol methyl ethyl ether, diethylene glycol dimethyl ether, diethylene glycol dibutyl ether, tetraethylene glycol dimethyl ether, tetraethylene glycol diethyl ether, propylene glycol dimethyl ether, dipropylene glycol dimethyl ether, dipropylene glycol diethyl ether, dipropylene glycol methyl n-propyl ether and tripropylene glycol dimethyl ether.

Examples of the lactate ester-based solvents include methyl lactate, ethyl lactate, butyl lactate, propyl lactate, ethylhexyl lactate, amyl lactate and isoamyl lactate.

These organic solvents may be used individually, or two or more solvents may be mixed. Among the various possibilities, from the viewpoints of achieving a good balance between the solubility of the dispersant and the binder resin, the ink moisture retention within the inkjet nozzles, and the drying properties of the ink coating film, specific examples of preferred organic solvents include ethylene glycol monobutyl ether acetate, diethylene glycol diethyl ether, diethylene glycol methyl ethyl ether, tetraethylene glycol dimethyl ether, dipropylene glycol monomethyl ether acetate, dipropylene glycol dimethyl ether and ethyl lactate.

From the viewpoints of the solubility of the binder resin and the ink moisture retention within the inkjet nozzles, the amount of the glycol monoester-based solvent, glycol diether-based solvent and/or lactate ester-based solvent in the ink is preferably within a range from 10 to 95%, more preferably from 30 to 90%, and still more preferably from 50 to 90%.

Adding a nitrogen-containing solvent or lactone-based solvent to the aforementioned organic solvent enables the surface of the recording medium to be dissolved, and as a result, the fixability, abrasion resistance, and alcohol resistance and the like of the ink coating film can be improved.

Examples of solvents that can be used favorably as the nitrogen-containing solvent or lactone-based solvent include 3-methyl-2-oxazolidinone, 3-ethyl-2-oxazolidinone, N-methyl-2-pyrrolidone, N-ethyl-2-pyrrolidone, γ-butyrolactone, ε-caprolactone, and β-alkoxypropionamides.

The amount added of the nitrogen-containing solvent or lactone-based solvent preferably represents 1 to 20%, and more preferably 1 to 10%, of the ink.

By adding at least 1%, the resistance properties of the ink coating film can be improved, and by ensuring the amount is not more than 20%, the stability of the ink can be maintained. Nitrogen-containing solvents and lactone-based solvents exhibit good resin solubility, and therefore if an amount exceeding 20% is added, then the dispersant adsorbed to the pigment may dissolve, causing a deterioration in the dispersion stability of the ink.

Examples of other organic solvents that may be used besides those described above include any solvent that does not cause corrosion of the inkjet printer head, and does not dissolve the pigment, causing a deterioration in the ink stability.

Specific examples of these other solvents include glycol monoether-based solvents such as ethylene glycol monomethyl ether, ethylene glycol monoethyl ether, ethylene glycol monobutyl ether, ethylene glycol monoisobutyl ether, propylene glycol monomethyl ether, propylene glycol monoethyl ether, propylene glycol monobutyl ether, diethylene glycol monomethyl ether, diethylene glycol monoethyl ether, diethylene glycol monobutyl ether, diethylene glycol 2-ethylhexyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, tripropylene glycol monomethyl ether and tripropylene glycol monobutyl ether, glycol diacetate-based solvents such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol dibutyrate, diethylene glycol acetate propionate, diethylene glycol acetate butyrate, diethylene glycol propionate butyrate, diethylene glycol dipropionate, diethylene glycol dibutyrate, propylene glycol acetate propionate, propylene glycol acetate butyrate, propylene glycol propionate butyrate, propylene glycol dipropionate, propylene glycol dibutyrate, dipropylene glycol acetate propionate, dipropylene glycol acetate butyrate, dipropylene glycol propionate butyrate, dipropylene glycol dipropionate and dipropylene glycol dibutyrate, alcohol-based solvents such as methyl alcohol, ethyl alcohol, n-propyl alcohol, isopropyl alcohol, n-butyl alcohol, 3-methoxybutanol and 3-methyl-3-methoxybutanol, ketone-based solvents such as acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, ester-based solvents such as methyl acetate, ethyl acetate, n-propyl acetate, isopropyl acetate, n-butyl acetate, isobutyl acetate, hexyl acetate, octyl acetate and methoxybutyl acrylate, glycols such as ethylene glycol, diethylene glycol, triethylene glycol, propylene glycol and dipropylene glycol, saturated hydrocarbon solvents such as n-hexane, isohexane, n-nonane, isononane, dodecane and isododecane, unsaturated hydrocarbon solvents such as 1-hexene, 1-heptene and 1-octene, cyclic saturated hydrocarbon solvents such as cyclohexane, cycloheptane, cyclooctane, cyclodecane and decalin, cyclic unsaturated hydrocarbons such as cyclohexene, cycloheptene, cyclooctene, 1,1,3,5,7-cyclooctatetraene and cyclododecene, aromatic hydrocarbon solvents such as benzene, toluene and xylene, as well as other typical organic solvents such as terpene-based solvents, ether-based solvents and cyclic imides and the like.

Among these other solvents, from the viewpoints of the ink stability and the inkjet discharge stability and the like, the use of a glycol monoether-based solvent and/or a glycol diacetate-based solvent is preferred. For example, glycol monoether-based solvents such as diethylene glycol monoethyl ether, triethylene glycol monomethyl ether, triethylene glycol monoethyl ether, triethylene glycol monobutyl ether, dipropylene glycol monomethyl ether, dipropylene glycol monoethyl ether and tripropylene glycol monomethyl ether can be used favorably.

The amount of the organic solvent contained within the ink is preferably within a range from 50.0 to 99.5% of the ink, more preferably from 80.0 to 99%, and still more preferably from 85.0 to 95%.

[Binder Resin]

The binder resin used in the present invention is a resin that imparts functionality such as abrasion resistance, alcohol resistance, stretchability, gloss, or substrate versatility or the like to the ink coating film. Examples of resins that may be used include typically employed resins such as acrylic-based resins, styrene-acrylic-based resins, styrene-maleic acid-based resins, vinyl chloride-vinyl acetate-based resins, vinyl chloride-based resins, rosin-modified resins, ethylene-vinyl acetate-based resins, terpene-based resins, phenolic resins, urethane resins, melamine resins, epoxy-based resins, cellulose-based resins, butyral resins, polyvinyl alcohol, polyester-based resins and polyamide-based resins.

These binder resins may be used individually, or two or more resins may be mixed.

Specific examples of the binder resin include acrylic-based resins of the DIANAL (a registered trademark) BR series manufactured by Mitsubishi Rayon Co., Ltd., such as BR-50, BR-52, MB-2539, BR-60, BR-64, BR-73, BR-75, MB-2389, BR-80, BR-82, BR-83, BR-84, BR-85, BR-87, BR-88, BR-90, BR-95, BR-96, BR-100, BR-101, BR-102, BR-105, BR-106, BR-107, BR-108, BR-110, BR-113, MB-2660, MB-2952, MB-3012, MB-3015, MB-7033, BR-115, MB-2478, BR-116, BR-117, BR-118, BR-122 and ER-502, acrylic-based resins of the PARALOID (a registered trademark) series manufactured by Wilbur-Ellis (Japan) Co., Ltd., such as A-11, A-12, A-14, A-21, B-38, B-60, B-64, B-66, B-72, B-82, B-44, B-48N, B-67, B-99N and DM-55, styrene-acrylic-based resins of the JONCRYL (a registered trademark) series manufactured by BASF Corporation, such as JONCRYL 67, 678, 586, 611, 680, 682, 683, 690, 819, JDX-C3000 and JDXC3080, vinyl chloride-vinyl acetate-based resins of the SOLBIN (a registered trademark) series manufactured by Nissin Chemical Industry Co., Ltd., such as SOLBIN CL, CNL, CSR, TA3 and TA5R (a suspension polymerization product), and vinyl chloride-vinyl acetate-based resins of the VINNOL (a registered trademark) series manufactured by Wacker Chemie AG, such as VINNOL E15/45, E15/45M, E15/40M, E15/48A (an emulsion polymerization product), H15/50, H15/42, H14/36, H40/43, H11/59 and H15/45M (a suspension polymerization product), rosin ester-based resins manufactured by Arakawa Chemical Industries, Ltd., such as SUPER ESTER 75, ESTER GUM HP and MALKYD 33, terpene phenol-based resins manufactured by Yasuhara Chemical Co., Ltd., such as YS POLYSTAR T80, and styrene-maleic acid-based resins manufactured by Sartomer Company, Inc., such as SMA2625P.

Among the above binder resins, from the viewpoints of the alcohol resistance, abrasion resistance and gloss and the like of the ink coating film, vinyl chloride-vinyl acetate-based resins and acrylic-based resins are preferred. These vinyl chloride-vinyl acetate-based resins and acrylic-based resins may be used individually, or two or more resins may be mixed.

A vinyl chloride-vinyl acetate-based resin is a copolymer of vinyl chloride and vinyl acetate. Examples of the polymerization methods that may be used include solution polymerization, suspension polymerization and emulsion polymerization.

In the present invention, the use of a vinyl chloride-vinyl acetate-based resin produced by solution polymerization or emulsion polymerization is preferred.

The polymerization ratio between the vinyl chloride and the vinyl acetate is preferably within a range from 95:5 to 70:30, and more preferably from 90:10 to 80:20.

An acrylic-based resin is a polymer containing an acrylate ester or a methacrylate ester. In the present invention, the acrylic-based resin is preferably a polymer containing a methacrylate ester, and a copolymer of methyl methacrylate (MMA) and butyl methacrylate (BMA) can be used particularly favorably as the methacrylate ester.

The polymerization ratio between the MMA and the BMA is preferably within a range from 100:0 to 60:40, and more preferably from 90:10 to 70:30.

The weight average molecular weight Mw of the binder resin is preferably from 3,000 to 70,000, more preferably from 5,000 to 60,000, and still more preferably from 20,000 to 60,000.

Provided the Mw value is at least 3,000, the ink coating film can be imparted with satisfactory resistance, and provided the Mw value is not more than 70,000, the resin has no impact on discharge of the ink from fine inkjet printer heads, which is also desirable. Mw values within the above range also yield excellent compatibility with the dispersant, enabling suppression of the whitening phenomenon.

The weight average molecular weight Mw value of the vinyl chloride-vinyl acetate-based resin is preferably from 3,000 to 70,000, more preferably from 5,000 to 60,000, and still more preferably from 30,000 to 60,000.

The weight average molecular weight Mw value of the acrylic-based resin is preferably from 3,000 to 100,000, more preferably from 5,000 to 70,000, and still more preferably from 20,000 to 50,000.

The acid value (mgKOH/g) of the acrylic-based resin is preferably from 0 to 20, and more preferably from 0 to 10.

The glass transition temperature of the acrylic-based resin is preferably from 0° C. to 150° C., and more preferably from 20° C. to 100° C.

The amount of the binder resin relative to the total weight of the ink is preferably from 1 to 20% by weight, and more preferably from 3 to 10% by weight. Provided the amount represents at least 1% by weight of the ink, the adhesion of the ink to the surface of the recording medium can be improved, and the resistance of the ink coating film can be improved. Provided the amount is not more than 20% by weight, the ink viscosity remains low, and the inkjet dischargeability improves favorably.

The amount of the vinyl chloride-vinyl acetate-based resin relative to the total weight of the ink is preferably from 1 to 10% by weight, and more preferably from 1 to 5% by weight.

The amount of the acrylic-based resin relative to the total weight of the ink is preferably from 1 to 20% by weight, and more preferably from 1 to 10% by weight.

[Pigment]

The pigment used in the present invention may be any of the various pigments used in printing inks and coating materials and the like. The pigment may be an achromatic pigment such as a carbon black, titanium oxide or calcium carbonate, or a colored organic pigment.

Examples of organic pigments that can be used favorably in the present invention, listed in terms of their color index (C.I.) number, include:

C.I. Pigment Yellow 12, 13, 14, 15, 16, 17, 20, 24, 55, 74, 83, 86, 87, 93, 109, 110, 117, 120, 125, 124, 128, 129, 137, 138, 139, 147, 148, 150, 151, 153, 154, 155, 166, 168, 170, 171, 172, 174, 176, 180, 185 and 188, C.I. Pigment Orange 16, 36, 43, 51, 55, 59, 61 and 64, C.I. Pigment Red 9, 48, 49, 52, 53, 57, 97, 122, 123, 146, 149, 150, 168, 177, 180, 185, 192, 202, 206, 207, 209, 215, 216, 217, 220, 223, 224, 226, 227, 228, 238, 240, 245 and 269, C.I. Pigment Violet 19, 23, 29, 30, 37, 40 and 50, C.I. Pigment Blue 15, 15:1, 15:3, 15:4, 15:6, 22, 60 and 64, C.I. Pigment Green 7 and 36, C.I. Pigment Brown 23, 25 and 26, and C.I. Pigment Black 1, 6 and 7.

Among the above pigments, quinacridone-based organic pigments, phthalocyanine-based organic pigments, benzimidazolone-based organic pigments, isoindolinone-based organic pigments, isoindoline-based organic pigments, quinophthalone-based organic pigments, condensed azo-based organic pigments and insoluble azo pigments and the like exhibit superior light resistance, solvent resistance, and coloration vividness and the like, and are therefore preferred.

From the viewpoints of the light resistance and the coloration vividness, examples of pigments that can be used favorably in the present invention include:

yellow pigments such as disazo yellow and nickel azo yellow pigments, which are condensed azo pigments, magenta pigments such as quinacridone pigments, which are condensed polycyclic pigments, and naphthol AS-based pigments, which are insoluble azo pigments, cyan pigments such as phthalocyanine-based pigments, and black pigments such as carbon blacks.

In terms of the coloring power, the storage stability and the inkjet viscosity applicability, the amount of these pigments in the ink is preferably from 1 to 15%, and more preferably from 1 to 8%.

Further, in some cases, light-colored inks may be used to reduce the image graininess, and in such cases, the amount of the pigment is preferably 1/10 to 1/2 that of the amount of pigment used in a more intensely colored ink.

The organic pigment is preferably a fine pigment for which the average particle size D50 is within a range from 50 to 300 nm. If the average particle size of the pigment is less than 50 nm, then the light resistance may worsen and the coloring power may deteriorate as a result of the reduced particle size, whereas if the average particle size exceeds 300 nm, then the ink stability may deteriorate, and blockages of the inkjet nozzles may occur, causing a deterioration in the discharge stability.

The average particle size of the pigment refers to the value for the median size (D50) when the inkjet ink is diluted 200 to 1,000 fold with ethyl acetate, and the particle size is then measured using a MICROTRAC UPA150 manufactured by Nikkiso Co., Ltd.

Examples of the disazo yellow pigment used in an ink containing a yellow pigment (hereafter referred to as a "yellow ink"), listed in terms of their color index (C.I.) number, include C.I. Pigment Yellow 12, 13, 14, 15, 16, 17, 55, 83, 87, 124, 170, 171, 172, 174, 176 and 188, and examples of the nickel azo yellow pigment include C.I. Pigment 150 and 153.

In the present invention, if the yellow ink is used with a magenta ink as an ink set, then in terms of the color reproducibility and coloration vividness of the red color region, benzidine-based disazo yellow pigments such as C.I. Pigment Yellow 12, 13, 14, 17, 55, 83, 174, 176 and 188 can be used favorably. Further, in terms of the light resistance and color reproducibility, the use of C.I. Pigment 83 is particularly desirable.

When the benzidine-based disazo yellow pigments mentioned above are used, the coloration vividness is particularly favorable compared with other pigments, and therefore the amount added of the pigment can be reduced. The amount of the pigment in the yellow ink is typically from 0.5 to 7.5%, preferably from 1 to 5%, and still more preferably from 1.5 to 3%. Adding an amount of at least 0.5% ensures satisfactory coloration vividness, and even if the amount is 7.5% or less, the coloration vividness is favorable, and the dischargeability and storage stability are also favorable.

Further, it is preferable that a benzidine-based disazo yellow pigment represents at least 50% by weight, and more preferably 90% by weight or more, of the entire weight of the pigment contained within the yellow ink.

In terms of the coloration vividness and the dischargeability, it is preferable that the average particle size (D50) of the benzidine-based disazo yellow pigment is within a range from 50 to 400 nm, and the 99% particle size (D99) is from 100 to 800 nm. It is even more desirable that D50 is from 100 to 300 nm, and D99 is from 300 to 700 nm.

When the D50 value for the benzidine-based disazo yellow pigment is at least 50 nm, the light resistance and coloration vividness, which are dependent on the particle size of the pigment, can be developed satisfactorily. Further, when the D99 value is 800 nm or less, blockages in the inkjet nozzles or filters can be suppressed, improving the discharge stability.

Examples of the quinacridone pigment used in an ink containing a magenta pigment (hereafter referred to as a "magenta ink") include C.I. Pigment Red 122, 202, 207 and 209, and C.I. Pigment Violet 19. Further, examples of the naphthol AS-based insoluble azo pigment include C.I. Pigment Red 2, 5, 7, 8, 9, 12, 23, 32, 112, 114, 146, 147, 148, 150, 170, 176, 184, 185, 187, 188, 245, 261 and 269.

In the present invention, if the magenta ink is used with a yellow ink as an ink set, then in terms of the color reproducibility of the red color region and the light resistance, C.I. Pigment Violet 19, and C.I. Pigment Red 122, 146, 150 and 184 are preferred, and the use of C.I. Pigment Violet 19 or C.I. Pigment Red 146 is particularly desirable. Among these, in terms of producing superior coloration vividness, C.I. Pigment Red 146 can be used particularly favorably.

In terms of the coloring power, storage stability, and discharge and printing properties, the amount of the magenta pigment within the ink is preferably from 1 to 12%, and more preferably from 2 to 10%. Provided the amount is at least 1%, satisfactory coloration vividness and color reproducibility can be achieved during printing. Even if the amount is 12% or less, the coloration vividness is favorable, the storage stability is also favorable, and the amount of binder resin that can be added to adjust the viscosity to a dischargeable viscosity can be increased, meaning the abrasion resistance and solvent resistance of the printed items can be improved.

Furthermore, it is preferable that either C.I. Pigment Violet 19 or C.I. Pigment Red 146 represents at least 50% by weight, and more preferably 90% by weight or more, of the entire weight of the pigment contained within the magenta ink.

In those cases where the inks are used as an ink set, it is preferable, from the viewpoints of the color reproducibility and the coloration vividness, to use:
 a benzidine disazo yellow pigment such as C.I. Pigment Yellow 12, 13, 14, 17, 55, 83, 174, 176 or 188 as the yellow pigment,
 a quinacridone pigment or naphthol As pigment such as C.I. Pigment Violet 19, or C.I. Pigment Red 122, 146 or 184 as the magenta pigment,
 a phthalocyanine-based pigment such as C.I. Pigment Blue 15, 15:1, 15:3, 15:4 or 15:6 as the cyan pigment, and
 a carbon black such C.I. Pigment 7 as the black pigment.

A pigment derivative may be used in the ink of the present invention. The pigment derivative is used for the purposes of further improving the adhesion to the dispersant and improving the storage stability.

The pigment derivative used in the present invention is preferably a pigment derivative having an acidic group, and either a compound having no electrical charge and represented by general formula (1) shown below, or a compound having an electrical charge and represented by general formula (2) or (3) shown below may be used.

In general formula (1), P represents an organic pigment residue, and $Z^1$ represents a sulfonic acid group or a carboxyl group.

In general formula (2), P represents an organic pigment residue, $R^{15}$ represents an alkyl group having a carbon number of 5 to 20, each of $R^{16}$, $R^{17}$ and $R^{18}$ independently represents an H atom or an alkyl group having a carbon number of 1 to 20, and $Z^2$ represents $SO_3^-$ or $COO^-$.

In general formula (3), P represents an organic pigment residue, M represents a Na or K atom, and $Z^2$ represents $SO_3^-$ or $COO^-$.

The organic pigment residue P in the pigment derivative represented by any of general formulas (1) to (3) need not necessarily have a chemical structure that matches the chemical structure of the pigment used in the ink. However, if consideration is given to the hue of the final ink, then using a pigment derivative having a P group of the same color system as the pigment being used enables the production of an ink of superior hue, and is consequently preferred.

Examples of P include one type of organic dye residue selected from among azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based and anthrapyrimidine-based residues.

The amount of the pigment derivative having an acidic group, relative to the amount of the pigment, is preferably at least 0.1% but not more than 20%, and more preferably at least 1% but not more than 15%. Provided the amount is at least 0.1%, the stability and coloration vividness can be improved, and provided the amount is not more than 20%, the viscosity of the ink falls within a favorable range, and the storage stability also improves favorably.

[Additives]

Moreover, in order to enhance the printability and the resistance of the printed items, the ink of the present invention may also use any of various additives such as surface conditioners, slip agents, plasticizers, ultraviolet inhibitors, photostabilizers, antioxidants, hydrolysis inhibitors and rust inhibitors.

Examples of surface conditioners that can be used favorably include polyether-modified polydimethylsiloxanes and acrylic-based surface conditioners.

[Inkjet Recording Method]

In an inkjet recording method using the ink of the present invention, an inkjet recorded image can be obtained, for example, by using an inkjet printer or the like loaded with the ink to discharge ink droplets from the inkjet head based on a digital signal, and adhere those ink droplets to a recording medium. The inkjet printer is preferably a drop-on-demand inkjet recording device.

In order to rapidly and reliably dry the ink adhered to the recording medium, a method in which the surface temperature of the recording medium is raised during image formation is preferred. The surface temperature can be adjusted in accordance with the durability of the recording medium and the drying properties of the ink, but is preferably from 40 to 100° C., and more preferably from 40 to 80° C.

Because the ink of the present invention exhibits a good balance between the dispersed particle size of the pigment and the dispersion stability, the inkjet discharge stability is excellent, and high-quality images can be obtained.

[Recording Medium]

There are no particular limitations on the printing substrate used in the present invention, and examples include plastic substrates such as soft polyvinyl chloride, hard polyvinyl chloride, polystyrene, expanded polystyrene, PMMA, polypropylene, polyethylene, PET and polycarbonate, mixed or modified products of these plastic substrates, paper substrates such as high-quality paper, art paper, coated paper and cast coated paper, glass, and metal substrates such as stainless steel.

Among these, in terms of price and processability, soft polyvinyl chloride sheets and hard polyvinyl chloride sheets, which are non-absorbent substrates, can be used particularly favorably.

[Production Method]

The ink of the present invention can be produced by conventional methods, and specifically, can be produced in the following manner. First, the individual or mixed organic solvent, the pigment and, if used, the binder resin and the dispersant and the like are mixed together, and a paint shaker, sand mill, roll mill, or media-less dispersion device or the like is used to disperse the pigment and prepare a pigment dispersion. The remainder of the organic solvent, the remainder of the binder resin and any other additives (such as surface conditioners) are then added to the obtained pigment dispersion to achieve the desired ink characteristics, thus completing the ink.

[Physical Properties of the Inkjet Ink]

From the viewpoint of the balance between the dischargeability from the inkjet printer head and the reliability of the dot formation following impact, the surface tension of the ink of the present invention at 25° C. is preferably at least 20 mN/m but not more than 50 mN/m, and is more preferably at least 25 mN/m but not more than 40 mN/m.

For similar reasons, the viscosity at 25° C. is preferably at least 2 mPa·s but not more than 20 mPa·s, and more preferably at least 5 mPa·s but not more than 15 mPa·s.

Measurement of the surface tension can be performed using an automatic surface tensiometer CBVP-Z manufactured by Kyowa Interface Science Co., Ltd., by determining the surface tension when a platinum plate is wetted with the ink under an atmosphere at 25° C. Measurement of the viscosity can be performed using a TVE25L viscometer manufactured by Toki Sangyo Co., Ltd., by reading the viscosity at 50 rpm under an atmosphere at 25° C.

The present invention is described below in further detail using a series of examples and comparative examples, but the present invention is not limited in any way by these examples.

EXAMPLES

Example 1

(Synthesis of Dispersant)

A dispersant of the properties shown in Table 1, having a (poly)ethyleneimine main chain and side chains having at least an oxyalkylenecarbonyl group, was synthesized by conventional methods. Specifically, synthesis was performed in accordance with the method disclosed in the examples of JP 2002-509787 A.

(Preparation of Pigment Dispersions)

Fourteen parts of the obtained dispersant was dissolved in 46 parts of ethylene glycol monobutyl ether acetate (BGAc), 40 parts of a carbon black (Raven 1060UP manufactured by Columbian Chemicals Company) was added, and following mixing for about 30 minutes using a high-speed mixer to obtain a uniform mixture, the mixture was dispersed in a 0.6 L horizontal sand mill for about one hour per 1 kg of mill base, thus obtaining a pigment dispersion.

(Inkjet Ink Preparation Example)

Ten parts of the obtained pigment dispersion, 5 parts of a vinyl chloride-vinyl acetate resin (vinyl chloride:vinyl acetate=85:15, Mw:55,000) and 83 parts of an organic solvent (BGAc) were mixed uniformly, and the resulting mixture was then filtered through a 1 µm filter to prepare an inkjet ink.

Examples 2 to 13, Comparative Examples 1 to 4

With the exceptions of altering the types and amounts of the pigment, the dispersant, the organic solvent and the binder resin as shown in Table 1, operations were performed in the same manner as Example 1. The amount added of the binder resin was adjusted so as to achieve an ink viscosity of 10 mPa·s.

The performance of the pigment dispersions and the inkjet inks obtained in the examples and the comparative examples was evaluated using the methods described below. In the following evaluation results, a result of Δ or better was deemed a good result.

[Viscosity of Pigment Dispersion]

The obtained pigment dispersion was adjusted to 25° C., the viscosity was measured using a TVE25L viscometer manufactured by Toki Sangyo Co., Ltd., and a lower viscosity was evaluated as more favorable, as shown below. The lower the viscosity, the more quickly dispersion can be performed, and the more readily an inkjet ink containing an added binder resin can be produced.

⊚: less than 150 mPa·s
○: at least 150 mPa·s but less than 250 mPa·s
Δ: at least 250 mPa·s but less than 350 mPa·s
X: 350 mPa·s or greater

[Particle Size of Pigment Dispersion]

The pigment dispersion was diluted 200 to 1,000 fold with ethyl acetate, and the particle size was measured using a MICROTRAC UPA150 manufactured by Nikkiso Co., Ltd. A smaller value for the obtained 99% particle size (D99) means that dispersion can be performed in a shorter period of time. From the viewpoints of discharge stability and whitening of the ink coating film, a smaller D99 value (Δ or better) is deemed more favorable.

⊚: 400 nm or less
◯: 400 nm<D99≤600 nm
Δ: 600 nm<D99≤800 nm
X: greater than 800 nm

[Inkjet Ink Stability]

Twenty mL of the ink was placed in a screw-top vial (capacity: about 20 mL), the vial was sealed, and after standing for one week in an atmosphere at 70° C., the viscosity was measured in the same manner as that described above for measurement of the dispersant viscosity. The stability of the ink over time was evaluated by comparing the measured viscosity with the initial viscosity immediately following production. The evaluation criteria were as follows.

⊚: the increase in viscosity following the test over time was less than 5% compared with the initial viscosity
◯: the increase in viscosity following the test over time was at least 5% but less than 10% compared with the initial viscosity
Δ: the increase in viscosity following the test over time was at least 10% but less than 15% compared with the initial viscosity
X: the increase in viscosity following the test over time was 15% or greater compared with the initial viscosity

[Whitening of Ink Coating Film]

The inkjet ink was printed at a print coverage rate of 100% onto a polyvinyl chloride resin sheet that had undergone no surface treatment (Metamark MD5) using a large inkjet printer (Color Painter 64S, manufactured by Seiko I Infotech Inc.), the resulting hue was evaluated visually by 50 people, and the number of people who detected whitening was recorded. A lower value for the number of people who detected whitening can be said to indicate a superior ink.

⊚: 5 people or less
◯: 6 to 10 people
Δ: 11 to 20 people
X: more than 20 people

[Alcohol Resistance]

The inkjet ink was printed at a print coverage rate of 100% onto a polyvinyl chloride resin sheet that had undergone no surface treatment (Metamark MD5) using a large inkjet printer (Color Painter 64S, manufactured by Seiko I Infotech Inc.), and the resulting printed sample was evaluated using a rubbing tester (model number AB301, manufactured by Tester Sangyo Co., Ltd.). The evaluation conditions involved dropping a single droplet of a diluted solution of ethanol/water=70/30 onto the printed sample, and then rubbing a test cloth (cannequin No. 3) 50 times back and forth over the printed surface with a loading of 200 g.

⊚: none of the coated surface was stripped away
◯: some coloration of the test cloth, and a slight deterioration in the color of the printed surface were observed
Δ: the coated surface was stripped away, but the substrate was not visible
X: the ink was stripped away, and at least half of the substrate was visible.

TABLE 1

| | Pigment dispersion | | | | | | | | Dispersion evaluation | | Ink Binder resin | | Ink coating film evaluation results | | |
|---|---|---|---|---|---|---|---|---|---|---|---|---|---|---|---|
| | | | Dispersant | | | | | Dispersion solvent | Viscosity | Particle size | Type | Amount (%) | Evaluation Stability | Whitening | Alcohol resistance |
| | Pigment | Mw | Mw/Mn | Acid value | Amine value | Main chain | Side chains | | | | | | | | |
| Example 1 | CB | 15000 | 1.6 | 10 | 40 | PEI | PCL | BGAc | ⊚ | ⊚ | A | 5.0 | ⊚ | ⊚ | ⊚ |
| Example 2 | CB | 15000 | 1.6 | 10 | 33 | PEI | PCL/PVL | BGAc | ⊚ | ⊚ | B | 5.0 | ⊚ | ⊚ | ⊚ |
| Example 3 | CB | 15000 | 1.6 | 20 | 30 | PEI | PCL | BGAc | ⊚ | ⊚ | C | 5.0 | ◯ | ⊚ | ⊚ |
| Example 4 | CB | 20000 | 1.9 | 10 | 33 | PEI | PCL | ethyl acetate | ◯ | ⊚ | C | 2.5 | ◯ | ◯ | ◯ |
| Example 5 | CB | 10000 | 2.5 | 10 | 40 | PEI | PCL | BGAc | ⊚ | Δ | A | 5.0 | Δ | ◯ | ◯ |
| Example 6 | CB | 15000 | 1.7 | 10 | 33 | PAA | PCL | DEDG | ◯ | ◯ | A | 4.2 | Δ | Δ | ◯ |
| Example 7 | CB | 15000 | 1.7 | 10 | 33 | PEI | PCL/acrylic | EGDA | ◯ | ⊚ | A | 2.7 | Δ | ◯ | ◯ |
| Example 8 | P.Y.150 | 15000 | 1.8 | 10 | 33 | PEI | PCL | BGAc | ⊚ | ⊚ | A | 5.0 | ⊚ | ⊚ | ⊚ |
| Example 9 | P.Y.154 | 15000 | 1.6 | 10 | 40 | PEI | PCL/PVL | BGAc | ⊚ | ⊚ | A | 5.0 | ⊚ | ⊚ | ⊚ |
| Example 10 | P.Y.83 | 15000 | 1.6 | 10 | 40 | PEI | PCL | BGAc | ⊚ | ⊚ | A | 5.0 | ⊚ | ⊚ | ⊚ |
| Example 11 | P.V.19 | 15000 | 1.6 | 10 | 40 | PEI | PCL | BGAc | ⊚ | ⊚ | A | 5.0 | ⊚ | ⊚ | ⊚ |
| Example 12 | P.R.122 | 15000 | 1.6 | 10 | 40 | PEI | PCL | BGAc | ⊚ | ⊚ | A | 5.0 | ⊚ | ⊚ | ⊚ |
| Example 13 | P.R.146 | 15000 | 1.6 | 10 | 40 | PEI | PCL | BGAc | ⊚ | ⊚ | A | 5.0 | ⊚ | ⊚ | ⊚ |
| Comparative Example 1 | CB | 50000 | 5 | 10 | 33 | PAA | PCL | BGAc | X | ◯ | X | 0.0 | ◯ | X | X |
| Comparative Example 2 | CB | 10000 | 1.6 | 180 | 0 | acrylic | — | BGAc | X | Δ | A | 0.2 | X | X | X |

TABLE 1-continued

| | Pigment dispersion | | | | | | | | Dispersion evaluation | | Ink Binder resin | | Ink coating film evaluation results | | |
|---|---|---|---|---|---|---|---|---|---|---|---|---|---|---|---|
| | | | | Dispersant | | | | Disper- | | | | | | | |
| | Pigment | Mw | Mw/Mn | Acid value | Amine value | Main chain | Side chains | sion solvent | Viscosity | Particle size | Type | Amount (%) | Evaluation Stability | Whitening | Alcohol resistance |
| Comparative Example 3 | CB | 10000 | 2 | 0 | 80 | PEI | — | BGAc | Δ | Δ | A | 1.0 | X | X | X |
| Comparative Example 4 | CB | 15000 | 1.5 | 30 | 10 | PAA | PCL | BGAc | Δ | ○ | A | 1.5 | Δ | X | X |

CB: carbon black
P.Y.150: Pigment Yellow 150
P.Y.154: Pigment Yellow 154
P.Y.83: Pigment Yellow 83
P.V.19: Pigment Violet 19
P.R.122: Pigment Red 122
P.R.146: Pigment Red 146
PEI: (poly)ethyleneimine
PAA: (poly)allylamine
PCL: (poly)caprolactone
PVL: (poly)valerolactone
acrylic: polyacrylate ester
BGAc: ethylene glycol monobutyl ether acetate
DEDG: diethylene glycol diethyl ether
EGDA: ethylene glycol diacetate
Binder Resin
A: vinyl chloride-vinyl acetate resin (vinyl chloride:vinyl acetate = 85:15, Mw: 55,000)
B: acrylic-based resin (MMA:BMA = 80:20)
C: a mixture of A and B above in a weight ratio of 50/50.
※ In Comparative Example 1, the viscosity was too high, and a binder resin could not be added.

As is evident from Table 1, the present invention has succeeded in providing an inkjet ink of superior resistance, which exhibits excellent storage stability and provides good suppression of whitening of the ink coating film when recorded onto a non-absorbent substrate such as a polyvinyl chloride.

Examples 14 to 34, Comparative Examples 5 to 8

Yellow Ink and Magenta Ink Preparation Examples

Using the blend amounts shown in Table 2, yellow inkjet inks Y1 to Y21 and magenta inkjet inks M1 to M4 were prepared.

The abbreviations used in Table 2 represent the following materials.
PY83: C.I. Pigment Yellow 83
PY12: C.I. Pigment Yellow 12
PY13: C.I. Pigment Yellow 13
PY14: C.I. Pigment Yellow 14
PY17: C.I. Pigment Yellow 17
PY55: C.I. Pigment Yellow 55
PY174: C.I. Pigment Yellow 174
PY176: C.I. Pigment Yellow 176
PY188: C.I. Pigment Yellow 188
PY150: C.I. Pigment Yellow 150
PY74: C.I. Pigment Yellow 74
PY120: C.I. Pigment Yellow 120
PY151: C.I. Pigment Yellow 151
PV19: C.I. Pigment Violet 19
PR122: C.I. Pigment Red 122
PR146: C.I. Pigment Red 146
PR48:3: C.I. Pigment Red 48:3
PB821: a basic dispersant (Mw=45,000, acid value: 18, amine value: 8) manufactured by Ajinomoto Fine-Techno Co., Inc., composed of a condensation product of a polyallylamine and a polyester having a free carboxylic acid group
PB822: a basic dispersant (Mw=50,000, acid value: 18, amine value: 13) manufactured by Ajinomoto Fine-Techno Co., Inc., composed of a condensation product of a polyallylamine and a polyester having a free carboxylic acid group
SP32000: SOLSPERSE 32000, a polyethyleneimine-based basic dispersant (M 25,000, acid value: 17, amine value: 23) manufactured by The Lubrizol Corporation
SPJ200: SOLSPERSE J200, a polyethyleneimine-based basic dispersant (Mw=15,000, acid value: 12, amine value: 22) manufactured by The Lubrizol Corporation
BGAc: ethylene glycol monobutyl ether acetate
DEDG: diethylene glycol diethyl ether
MEDG: diethylene glycol ethyl methyl ether
DMTeG: tetraethylene glycol dimethyl ether
MOZ: 3-methyl-2-oxazolidinone
ECL: ε-caprolactone
GBL: γ-butyrolactone
E15/45: a vinyl chloride-vinyl acetate-based resin (vinyl chloride/vinyl acetate=84.9/15.1, Mw: 55,000, Tg: 75° C.) manufactured by Wacker Chemie AG
BR87: DIANAL BR-87, an acrylic-based resin (Mw: 25,000, calculated Tg: 105° C.) manufactured by Mitsubishi Rayon Co., Ltd.
BR113: DIANAL BR-113, an acrylic-based resin (Mw: 30,000, calculated Tg: 3.5° C.) manufactured by Mitsubishi Rayon Co., Ltd.
J586: JONCRYL 586, a styrene-acrylic-based resin (Mw: 4,600, measured Tg: 60° C.) manufactured by BASF Corporation The storage stability and the coloration vividness of the yellow inks Y1 to Y21 and the magenta inks M1 to M4 were evaluated. The storage stability was evaluated using the same method as that described above for evaluation of the inkjet ink stability. The coloration vividness was evaluated in the manner described below.

[Coloration Vividness]

The yellow ink or magenta ink described above was loaded into the head of a Color Painter 64S (a large inkjet printer, manufactured by Seiko I Infotech Inc.) in an environment at 25° C., and printing was performed onto a polyvinyl chloride sheet substrate that had undergone no surface treatment at a print coverage rate of 100%, 200% or 400%. Each of the thus obtained printed items was analyzed for coloration vividness using an X-Rite 528 manufactured by X-Rite, Inc., by measuring the OD value at 5 random locations under filter T conditions, and determining the average value of the measurements. The evaluation criteria were as follows. An evaluation of C or better was deemed a good result for the printed item with a print coverage rate of 100%, and an evaluation of ○ or better was deemed a good result for the other printed items.

◎: OD of 1.5 or greater
○: OD of at least 1.2 but less than 1.5
Δ: OD of at least 0.9 but less than 1.2
X: OD of less than 0.9

The evaluation results are shown in Table 2.

TABLE 2

| | Ink | Pigment Type | Pigment Amount | Dispersant Type | Dispersant Amount | Binder resin E15/45 | Binder resin BR87 | Binder resin BR113 | Binder resin J586 | Organic solvent BGAc | Organic solvent DEDG | Organic solvent MEDG |
|---|---|---|---|---|---|---|---|---|---|---|---|---|
| Example 14 | Y1 | PY83 | 2 | PB821 | 1.2 | 5 | | | | 86.8 | | |
| Example 15 | Y2 | PY83 | 2 | PB821 | 1.2 | 5 | | | | 86.8 | | |
| Example 16 | Y3 | PY83 | 2 | PB821 | 1.2 | 3 | | 2 | | 86.8 | | |
| Example 17 | Y4 | PY83 | 2 | PB821 | 1.2 | 3 | 2 | | | | 76.8 | |
| Example 18 | Y5 | PY83 | 2 | PB821 | 1.2 | 3 | 2 | | | 86.8 | | |
| Example 19 | Y6 | PY83 | 2 | PB821 | 1.2 | | | 5 | | | 56.8 | 25 |
| Example 20 | Y7 | PY83 | 2 | PB822 | 1.2 | 5 | | | | 86.8 | | |
| Example 21 | Y8 | PY83 | 2 | SP32000 | 1.2 | 5 | | | | 86.8 | | |
| Example 22 | Y9 | PY83 | 2 | SPJ200 | 1.2 | 5 | | | | 86.8 | | |
| Example 23 | Y10 | PY12 | 2 | PB821 | 1.2 | 5 | | | | 86.8 | | |
| Example 24 | Y11 | PY13 | 2 | PB821 | 1.2 | 5 | | | | 86.8 | | |
| Example 25 | Y12 | PY14 | 2 | PB821 | 1.2 | 5 | | | | 86.8 | | |
| Example 26 | Y13 | PY17 | 2 | PB821 | 1.2 | 5 | | | | 86.8 | | |
| Example 27 | Y14 | PY55 | 2 | PB821 | 1.2 | 5 | | | | 86.8 | | |
| Example 28 | Y15 | PY174 | 2 | PB821 | 1.2 | 5 | | | | 86.8 | | |
| Example 29 | Y16 | PY176 | 2 | PB821 | 1.2 | 5 | | | | 86.8 | | |
| Example 30 | Y17 | PY188 | 2 | PB821 | 1.2 | 5 | | | | 86.8 | | |
| Comparative Example 5 | Y18 | PY150 | 2 | PB821 | 1.2 | 5 | | | | 86.8 | | |
| Comparative Example 6 | Y19 | PY74 | 2 | PB821 | 1.2 | 5 | | | | 86.8 | | |
| Comparative Example 7 | Y20 | PY120 | 2 | PB821 | 1.2 | 5 | | | | 86.8 | | |
| Comparative Example 8 | Y21 | PY151 | 2 | PB821 | 1.2 | 5 | | | | 86.8 | | |
| Example 31 | M1 | PV19 | 7 | PB821 | 4.2 | 2 | | | 1 | 80.8 | | |
| Example 32 | M2 | PR122 | 7 | PB821 | 4.2 | 4 | | | | 79.8 | | |
| Example 33 | M3 | PR146 | 4 | PB821 | 2.4 | 5 | | | | 83.6 | | |
| Example 34 | M4 | PR48:3 | 7 | PB821 | 4.2 | 2 | | | 1 | 80.8 | | |

| | Organic solvent DMTeG | Organic solvent MOZ | Organic solvent ECL | Organic solvent GBL | Storage stability | Coloration vividness 100% print coverage rate patch | Coloration vividness 200% print coverage rate patch | Coloration vividness 400% print coverage rate patch |
|---|---|---|---|---|---|---|---|---|
| Example 14 | | | 5 | | ◎ | ○ | ○ | ◎ |
| Example 15 | | | | 5 | ○ | ○ | ○ | ◎ |
| Example 16 | | 5 | | | ◎ | ○ | ○ | ◎ |
| Example 17 | 10 | 5 | | | ◎ | ○ | ○ | ◎ |
| Example 18 | | | | 5 | ◎ | ○ | ○ | ◎ |
| Example 19 | 5 | | 5 | | ○ | ○ | ○ | ◎ |
| Example 20 | | | 5 | | ◎ | ○ | ○ | ◎ |
| Example 21 | | | 5 | | ○ | ○ | ○ | ◎ |
| Example 22 | | | 5 | | Δ | ○ | ○ | ◎ |
| Example 23 | | | 5 | | ○ | ○ | ○ | ◎ |
| Example 24 | | | 5 | | ○ | ○ | ○ | ◎ |
| Example 25 | | | 5 | | ○ | Δ | ○ | ◎ |
| Example 26 | | | 5 | | Δ | Δ | ○ | ○ |
| Example 27 | | | 5 | | ○ | Δ | ○ | ◎ |
| Example 28 | | | 5 | | ○ | ○ | ○ | ◎ |
| Example 29 | | | 5 | | ○ | Δ | ○ | ◎ |
| Example 30 | | | 5 | | ○ | ○ | ○ | ◎ |
| Comparative Example 5 | | | 5 | | ○ | X | Δ | ○ |
| Comparative Example 6 | | | 5 | | X: dispersion impossible, so no evaluation | | | |
| Comparative Example 7 | | | 5 | | ◎ | X | X | Δ |

TABLE 2-continued

|  |  |  |  |  |  |
|---|---|---|---|---|---|
| Comparative Example 8 |  | 5 | ◉ | X | X | Δ |
| Example 31 |  | 5 | ◉ | ○ | ○ | ◉ |
| Example 32 | 5 |  | ◉ | ○ | ○ | ◉ |
| Example 33 |  | 5 | ◉ | ○ | ○ | ◉ |
| Example 34 |  |  | 5 | ○ | ○ | ○ | ◉ |

From the results in Table 2 it was evident that the inkjet inks of the present invention exhibited excellent storage stability and coloration vividness.

Examples 35 to 51, Comparative Examples 9 to 12

Ink Set Preparation Examples and Evaluation

For each of the ink sets shown in Table 3, prepared by combining each of the yellow inks Y1 to Y21 with each of the magenta inks M1 to M4, the color reproducibility was evaluated using the method described below.

[Color Reproducibility]

The yellow ink and the magenta ink were each loaded into one of two heads of a Color Painter 64S (a large inkjet printer, manufactured by Seiko I Infotech Inc.) in an environment at 25° C. The yellow ink and the magenta ink were printed simultaneously onto a polyvinyl chloride sheet substrate that had undergone no surface treatment using print coverage rates of 100% for the yellow ink and 100% for the magenta ink, thus preparing a printed item.

Using an X-Rite 528 manufactured by X-Rite, Inc., the a value and the b value were measured at 5 random locations on the yellow and magenta 200% mixed color portion, using a viewing angle of 2°, a light source C and Hunter's calculation method, and the average of each value was determined. Using the thus obtained a value and b value, the saturation C was calculated using the following formula.

$$C = \sqrt{(a^2 + b^2)}$$

A color reproducibility evaluation was performed by comparing the calculated saturation values C for each of the magenta inks. Specifically, the difference was determined relative to the saturation (hereafter referred to as $C_{STD}$) when the widely used C.I. Pigment Yellow 150 was used as the yellow pigment for a non-aqueous inkjet ink. The evaluation criteria were as follows. An evaluation of Δ or better was deemed a good result.

○: $2 \leq (C - C_{STD})$
Δ: $0 \leq (C - C_{STD}) < 2$
X: $(C - C_{STD}) < 0$

TABLE 3

|  |  | Magenta | | | |
|---|---|---|---|---|---|
|  | Yellow | M1 | M2 | M3 | M4 |
| Example 35 | Y1 | ○ | ○ | ○ | ○ |
| Example 36 | Y2 | ○ | ○ | ○ | ○ |
| Example 37 | Y3 | ○ | ○ | ○ | ○ |
| Example 38 | Y4 | ○ | ○ | ○ | ○ |
| Example 39 | Y5 | ○ | ○ | ○ | ○ |
| Example 40 | Y6 | ○ | ○ | ○ | ○ |
| Example 41 | Y7 | ○ | ○ | ○ | ○ |
| Example 42 | Y8 | ○ | ○ | ○ | ○ |
| Example 43 | Y9 | ○ | ○ | ○ | ○ |
| Example 44 | Y10 | Δ | Δ | Δ | Δ |
| Example 45 | Y11 | ○ | ○ | ○ | ○ |
| Example 46 | Y12 | Δ | Δ | Δ | Δ |
| Example 47 | Y13 | ○ | ○ | ○ | Δ |
| Example 48 | Y14 | ○ | Δ | ○ | Δ |
| Example 49 | Y15 | Δ | Δ | ○ | Δ |
| Example 50 | Y16 | ○ | ○ | ○ | Δ |
| Example 51 | Y17 | Δ | Δ | Δ | Δ |
| Comparative Example 9 | Y18 | (Used as $C_{STD}$) | | | |
| Comparative Example 10 | Y19 | Dispersion impossible, so no evaluation | | | |
| Comparative Example 11 | Y20 | Δ | X | ○ | X |
| Comparative Example 12 | Y21 | ○ | Δ | ○ | Δ |

From the results in Table 3 it was evident that the ink sets of the present invention exhibited excellent color reproducibility.

The invention claimed is:

1. A solvent-based inkjet ink comprising at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50, and
    wherein the dispersant has a main chain composed of a polyethyleneimine and a side chain having at least an oxyalkylenecarbonyl group.

2. The solvent-based inkjet ink according to claim 1, wherein the dispersant has a weight average molecular weight (Mw) of 5,000 to 20,000, an acid value (mgKOH/g) of 5 to 20, and an amine value (mgKOH/g) of 20 to 50.

3. The solvent-based inkjet ink according to claim 1, wherein a ratio (Mw/Mn) of the weight average molecular weight (Mw) relative to a number-average molecular weight (Mn) of the dispersant is not more than 2.

4. The solvent-based inkjet ink according to claim 1, wherein the organic solvent comprises at least one solvent selected from the group consisting of glycol monoester-based solvents, glycol diether-based solvents and lactate ester-based solvents.

5. The solvent-based inkjet ink according to claim 1, wherein the binder resin comprises at least one resin selected from the group consisting of vinyl chloride-vinyl acetate-based resins and acrylic-based resins.

6. The solvent-based inkjet ink according to claim 1, wherein the pigment comprises at least one disazo yellow pigment selected from the group consisting of C.I. Pigment Yellow 12, 13, 14, 17, 55, 83, 174, 176 and 188.

7. The solvent-based inkjet ink according to claim 6, wherein the disazo yellow pigment comprises C.I. Pigment Yellow 83.

8. The solvent-based inkjet ink according to claim 1, wherein the pigment comprises at least one pigment selected from the group consisting of quinacridone pigments and naphthol AS-based pigments.

9. The solvent-based inkjet ink according to claim 8, wherein the pigment comprises at least one pigment selected from the group consisting of C.I. Pigment Violet 19, and C.I. Pigment Red 122 and 146.

10. The solvent-based inkjet ink according to claim 1, wherein the pigment comprises a phthalocyanine pigment.

11. An ink set comprising:
a solvent-based inkjet ink comprising at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50, and wherein the dispersant has a main chain composed of a polyethyleneimine and a side chain having at least an oxyalkylenecarbonyl group; and wherein the pigment comprises at least one disazo yellow pigment selected from the group consisting of C.I. Pigment Yellow 12, 13, 14, 17, 55, 83, 174, 176 and 188; and a solvent-based inkjet ink comprising at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50, and wherein the dispersant has a main chain composed of a polyethyleneimine and a side chain having at least an oxyalkylenecarbonyl group; and wherein the pigment comprises at least one pigment selected from the group consisting of quinacridone pigments and naphthol AS-based pigments.

12. The ink set according to claim 11, further comprising a solvent-based inkjet ink comprising at least a pigment, an organic solvent, a binder resin and a dispersant, wherein the dispersant has a weight average molecular weight (Mw) of at least 5,000 but less than 50,000, an acid value (mgKOH/g) of 5 to 20, and an amine value (mgKOH/g) of 5 to 50, and wherein the dispersant has a main chain composed of a polyethyleneimine and a side chain having at least an oxyalkylenecarbonyl group; and wherein the pigment comprises a phthalocyanine pigment.

* * * * *